United States Patent
Avancha et al.

(10) Patent No.: US 12,535,212 B2
(45) Date of Patent: Jan. 27, 2026

(54) ACOUSTIC LINER FOR A GAS TURBINE ENGINE

(71) Applicant: General Electric Company, Schenectady, NY (US)

(72) Inventors: Ravikanth Avancha, Bengaluru (IN); Ravish Karve, Bengaluru (IN); Jeffrey Donald Clements, Mason, OH (US); Hiranya Kumar Nath, Bengaluru (IN); Timothy Richard DePuy, Liberty Township, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/853,200

(22) Filed: Jun. 29, 2022

(65) Prior Publication Data
US 2024/0003543 A1 Jan. 4, 2024

(51) Int. Cl.
  *F23R 3/00* (2006.01)
  *F01D 9/02* (2006.01)
  *F02C 7/24* (2006.01)

(52) U.S. Cl.
  CPC ............. *F23R 3/002* (2013.01); *F01D 9/023* (2013.01); *F02C 7/24* (2013.01); *F23R 2900/00014* (2013.01)

(58) Field of Classification Search
  CPC .. F01D 9/023; F02C 7/24; F23R 3/002; F23R 2900/00014
  See application file for complete search history.

(56) References Cited

U.S. PATENT DOCUMENTS

| | | | |
|---|---|---|---|
| 6,366,093 B1* | 4/2002 | Hartman | G01R 33/482 324/318 |
| 6,439,840 B1 | 8/2002 | Tse | |
| 7,805,943 B2 | 10/2010 | Desaulty et al. | |
| 8,978,382 B2 | 3/2015 | Huber et al. | |
| 9,249,977 B2 | 2/2016 | Kimura et al. | |
| 9,625,158 B2 | 4/2017 | Olsen et al. | |
| 10,174,675 B2 | 1/2019 | Martinez et al. | |
| 10,844,791 B2 | 11/2020 | Olsen et al. | |
| 2005/0097890 A1* | 5/2005 | Ikeda | F23R 3/002 60/752 |
| 2009/0004000 A1* | 1/2009 | Baumhauer | F01D 25/246 415/209.3 |
| 2010/0189546 A1* | 7/2010 | Liu | F02K 1/827 415/119 |

(Continued)

FOREIGN PATENT DOCUMENTS

WO WO2019/027508 A1 2/2019

*Primary Examiner* — Devon C Kramer
*Assistant Examiner* — Henry Ng
(74) *Attorney, Agent, or Firm* — Dority & Manning, P.A.

(57) ABSTRACT

A gas turbine engine is provided. The gas turbine engine includes a turbomachine having a compressor section, a combustion section, and a turbine section arranged in serial flow order and together defining a working gas flowpath, the turbomachine including an acoustic liner, the acoustic liner having: a flowpath wall exposed to the working gas flowpath, the flowpath wall defining an opening; and a duct wall extending from the flowpath wall defining at least in part an acoustic passage defining a volume, the acoustic passage operable to attenuate noise through the working gas flowpath during an operating condition of the gas turbine engine.

16 Claims, 6 Drawing Sheets

(56) References Cited

U.S. PATENT DOCUMENTS

| | | | |
|---|---|---|---|
| 2011/0220433 A1* | 9/2011 | Nakamura | F23M 20/005 |
| | | | 181/213 |
| 2012/0006028 A1* | 1/2012 | Lee | F23R 3/06 |
| | | | 60/725 |
| 2013/0206500 A1* | 8/2013 | Ono | F23R 3/002 |
| | | | 181/213 |
| 2013/0283821 A1* | 10/2013 | Gilson | F04D 29/644 |
| | | | 415/119 |
| 2014/0238029 A1* | 8/2014 | Sutcu | F23R 3/26 |
| | | | 60/754 |
| 2015/0020498 A1* | 1/2015 | Schilp | F01D 9/023 |
| | | | 60/39.83 |
| 2015/0037135 A1 | 2/2015 | Kempton | |
| 2017/0108221 A1* | 4/2017 | Mizukami | F01D 9/023 |
| 2017/0316771 A1* | 11/2017 | Denker | F02M 21/0206 |
| 2018/0180288 A1* | 6/2018 | Kugimiya | F23R 3/42 |
| 2018/0218723 A1 | 8/2018 | Lin et al. | |
| 2018/0313540 A1* | 11/2018 | Nagaraja | F23R 3/286 |
| 2019/0128137 A1* | 5/2019 | Wesling | F01D 5/06 |
| 2020/0080512 A1 | 3/2020 | Sanz Martinez et al. | |
| 2020/0109664 A1 | 4/2020 | Herman et al. | |
| 2021/0095617 A1* | 4/2021 | Richter | F02K 1/827 |
| 2021/0302017 A1* | 9/2021 | Tokuyama | F23R 3/06 |
| 2022/0084493 A1* | 3/2022 | Bifulco | F01D 25/24 |
| 2022/0282688 A1* | 9/2022 | Trebs | F02K 7/10 |

* cited by examiner

ACOUSTIC LINER FOR A GAS TURBINE ENGINE

FIELD

The present disclosure relates to an acoustic liner for a gas turbine engine, such as an acoustic liner that may be incorporated into a turbine section of the gas turbine engine.

BACKGROUND

A gas turbine engine generally includes a turbomachine and a rotor assembly. Gas turbine engines, such as turbofan engines, may be used for aircraft propulsion. In the case of a turbofan engine, the rotor assembly may be configured as a fan assembly. During takeoff and landing operations, an aircraft incorporating the gas turbine engine may need to meet certain noise restrictions as may be prescribed by, e.g., the Federal Aviation Administration. Accordingly, improvements to a gas turbine engine to reduce noise generated by the gas turbine engine would be welcomed in the art.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
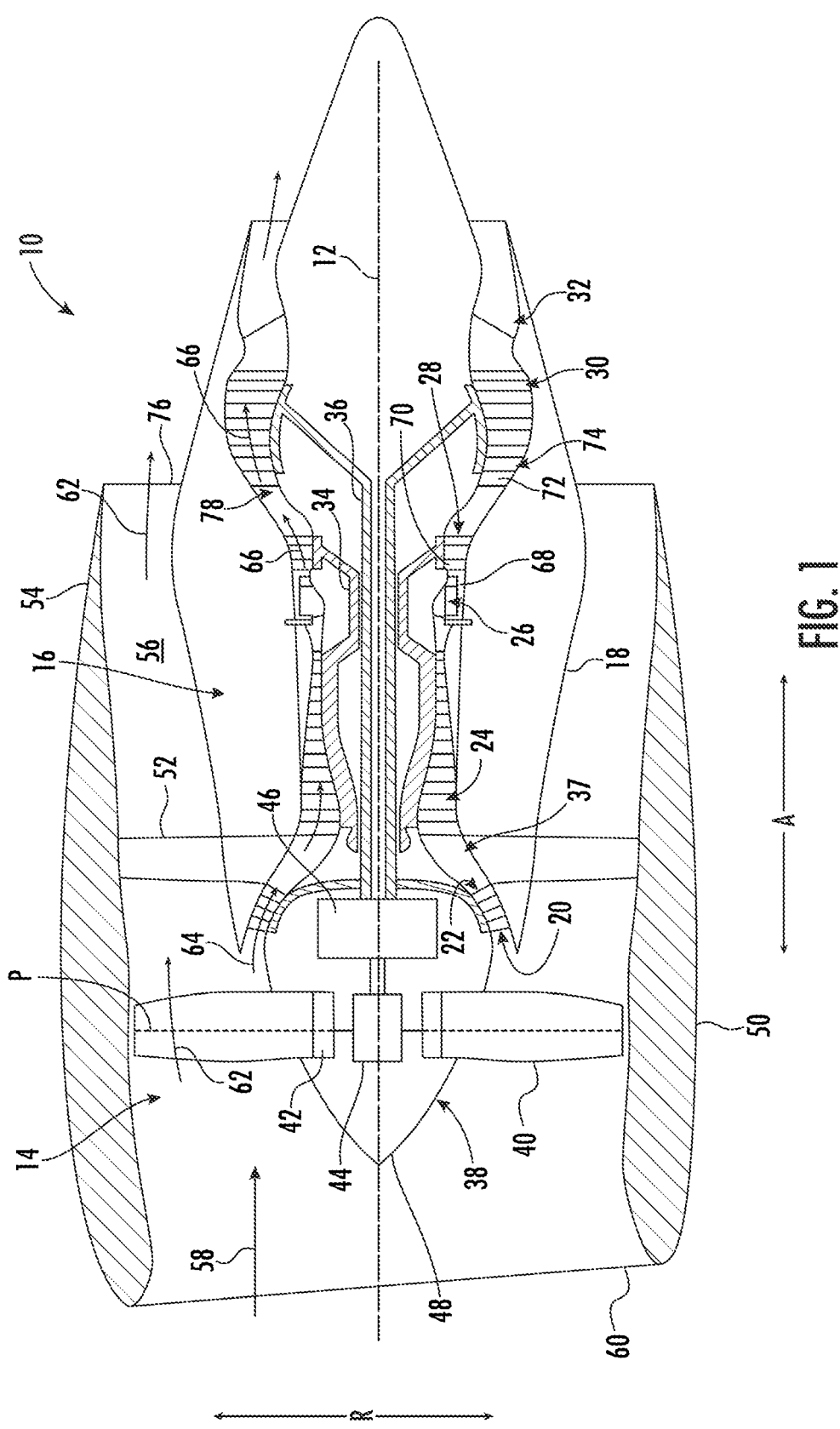
FIG. 1 is a cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "rated speed" with reference to a gas turbine engine refers to a maximum rotational speed that the gas turbine engine may achieve while operating properly. For example, the gas turbine engine may be operating at the rated speed during maximum load operations, such as during takeoff operations.

The term "standard day operating condition" refers to ambient conditions of sea level altitude, 59 degrees Fahrenheit, and 60 percent relative humidity.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any suitable additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies may include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, and other additive manufacturing technologies that utilize an energy beam or other energy source to solidify an additive manufacturing material such as a powder material. In fact, any suitable additive manufacturing modality may be utilized with the presently disclosed the subject matter.

In order to reduce ground noise from an aircraft, various measures may be taken to either attenuate noise created by various aspects of a gas turbine engine incorporated into the aircraft, or reduce an amount of noise generated by the gas turbine engine. A large source of gas turbine engine noise may be a fan of the gas turbine engine. Various acoustic treatments may be provided around or downstream of the fan in an attempt to attenuate fan noise. Notably, the fan for commercial aircraft, such as the fan on high bypass turbofan engines, typically operates at a relatively low pressure ratio (e.g., less than 2, or even less than 1.5), and an airflow through the fan and over the components downstream of the fan is generally at a relatively low speed (e.g., subsonic). Accordingly, the acoustic treatments may not significantly affect a specific fuel consumption of the gas turbine engine.

By contrast, however, the conditions within a working gas flowpath defined through a turbomachine are much different. A compressor section of the turbomachine, for example, may define an overall pressure ratio of 15 or higher, such that the airflow provided to a combustor is at a very high pressure. Such airflow is then mixed with fuel and combusted (generating combustion gasses) before it is provided to a turbine section of the turbomachine. The turbine section must extract energy from the combustion gasses. The extraction of energy from the combustion gasses is key to efficiently generating thrust for the aircraft. Accordingly, aerodynamics have traditionally been thought of as paramount, particularly within a portion of the working gas flowpath extending through the turbine section of the gas turbine engine.

Moreover, the inventors have found that a noise generated by the combustor of the gas turbine engine is at a relative low frequency, particularly as compared to the fan. With respect to a resonator system that may attenuate noise, a volume needed for a resonator to attenuate noise at a particular frequency is inverse to the frequency of the noise (i.e., a lower volume resonator may attenuate noise at a high frequency, while a higher volume resonator is needed to attenuate noise at a low frequency). As such, this relationship may make it difficult to position a traditional resonator to attenuate combustor noise, as a large amount of volume would be needed, and such a resonator would presumably require a relatively large radial footprint (at a location where space is at a premium).

However, the inventors of the present disclosure have discovered an acoustic liner position, configuration, or both to address the above obstacles, allowing for the acoustic liner, in at least certain configurations to attenuate the relatively low frequency noise that may be generated by the combustor of the gas turbine engine during an operating condition of the gas turbine engine.

For example, one exemplary aspect of the present disclosure is directed to a gas turbine engine having a turbomachine, the turbomachine including: a compressor section, a combustion section, and a turbine section arranged in serial flow order and together defining a working gas flowpath. The turbomachine also includes an acoustic liner. The acoustic liner includes a flowpath wall and a duct wall. The flowpath wall is exposed to the working gas flowpath at a location downstream of the combustion section and defines an opening. The duct wall extends from the flowpath wall and defines at least in part an acoustic passage defining a volume. The acoustic passage operable to attenuate noise through the working gas flowpath within the turbine section during the operating condition of the gas turbine engine.

In particular, in one exemplary embodiment, the acoustic passage extends in the circumferential direction, e.g., at least 15 degrees and up to 360 degrees in the circumferential direction relative to a longitudinal centerline of the gas turbine engine. In such a manner, the acoustic passage may be configured with a sufficient volume to attenuate low frequency noise from the combustor without requiring a prohibitively large radial footprint, and while allowing several additional acoustic passages to be spaced relatively closely along an axial direction.

In another exemplary embodiment, the acoustic passage may be incorporated into an engine frame strut extending through the working gas flowpath (e.g., a turbine center frame strut or turbine rear frame strut). With such a configuration the acoustic passage may be defined within an interior of the strut to achieve a sufficient volume to attenuate low frequency noise from the combustor without requiring a prohibitively large radial footprint.

Further, in another exemplary embodiment, a structure of the acoustic liner may be prescribed by a resonance frequency equation, such that the acoustic passage attenuates noise at a frequency between 100 Hz and 1,000 Hz. In particular, the acoustic liner may have an opening defining an area and a length, and the acoustic passage may define a volume, all prescribed by the resonance frequency equation to attenuate noise between 100 Hz and 1,000 Hz. Such may allow for the acoustic liner to specifically target noise generated by the combustor during the operating condition of the gas turbine engine.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R, and a circumferential direction C (now shown in FIG. 1; see, e.g., circumferential direction C in FIG. 5, below) extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed.

Referring still to the exemplary embodiment of FIG. 1, the disk 42 is covered by a rotatable front hub 48 of the fan section 14 (sometimes also referred to as a "spinner"). The front hub 48 is aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, a downstream section 54 of the nacelle 50 extends over an outer portion of the turbomachine 16 so as to define a bypass airflow passage 56 therebetween.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass airflow passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the HP turbine 28 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine. For example, in other exemplary embodiments, aspects of the present disclosure may (as appropriate) be incorporated into, e.g., a turboprop gas turbine engine, a turboshaft gas turbine engine, or a turbojet gas turbine engine.

Figure 2:
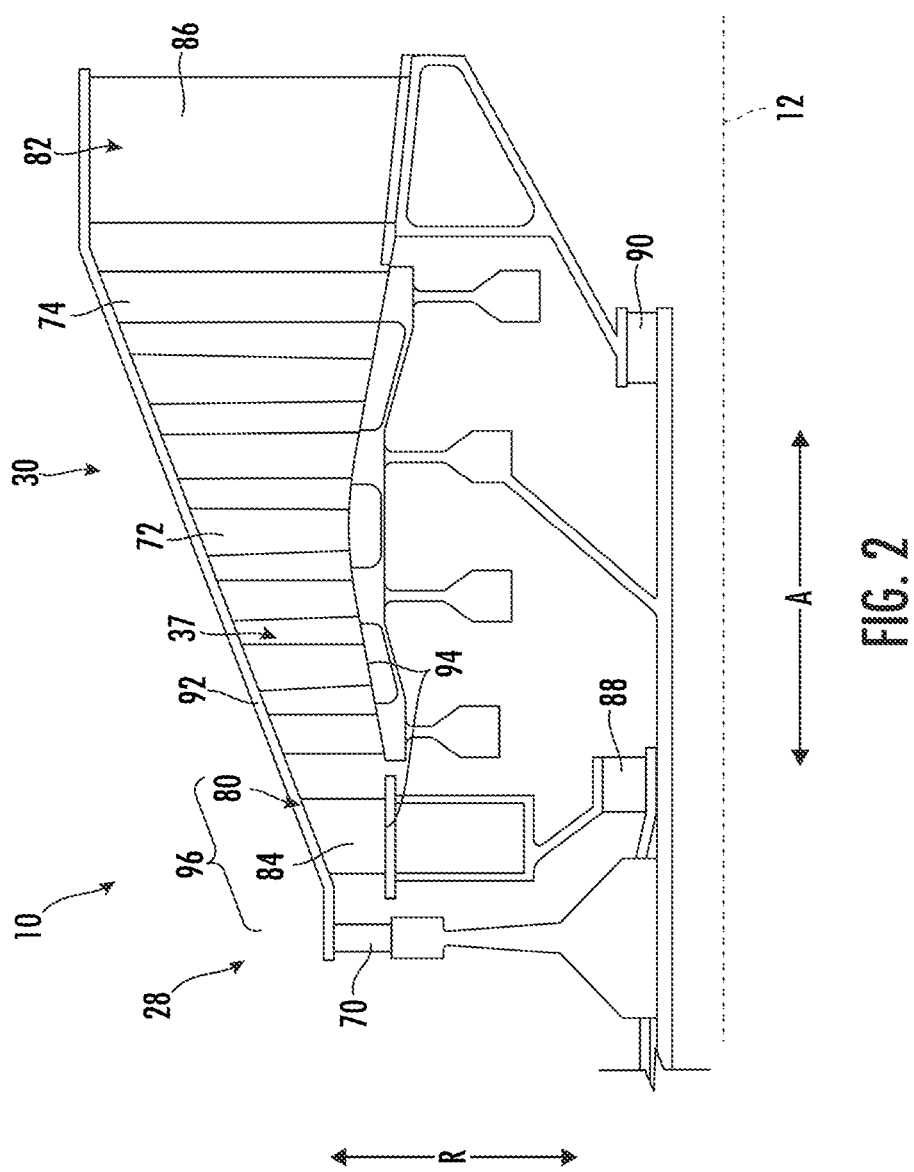
FIG. 2 is a close-up, schematic view of a portion of a turbine section of the exemplary gas turbine engine of FIG. 1, in accordance with an exemplary aspect of the present disclosure.

Referring now to FIG. 2, a close-up, schematic view is depicted of a portion of the turbine section of the exemplary gas turbine engine 10 of FIG. 1. As shown, the turbine section includes a first turbine and a second turbine in serial flow order, and more specifically, includes the HP turbine 28 and the LP turbine 30. The HP turbine 28 is coupled to the HP shaft 34 (FIG. 1) and the LP turbine 30 is coupled to the LP shaft 36 (FIG. 1). For the embodiment shown, the HP turbine 28 includes a plurality of HP turbine rotor blades 70 and the LP turbine 30 includes a plurality of LP turbine rotor blades 74 and a plurality of LP turbine stator vanes 72.

Further, the exemplary gas turbine engine 10, and more specifically the turbine section of the gas turbine engine 10, includes a turbine frame supporting rotation of at least one turbine of the turbine section. In particular, for the embodiment shown, the turbine section includes a turbine center frame 80 extending through the working gas flowpath 37 at a location downstream of the HP turbine 28 and upstream of the LP turbine 30, and a turbine rear frame 82 extending through the working gas flowpath 37 at a location downstream of the LP turbine 30. The turbine center frame 80 more specifically includes a turbine center frame strut 84 extending through the working gas flowpath 37 at the location downstream of the HP turbine 28 and upstream of the LP turbine 30, and the turbine rear frame 82 more specifically includes a turbine rear frame strut 86 extending through the working gas flowpath 37 at the location downstream of the LP turbine 30. The turbine center frame strut 84 may generally be configured as an airfoil and the turbine rear frame strut 86 may also generally be configured as an airfoil.

Notably, in the embodiment depicted, the turbine center frame 80 supports rotation of the HP turbine 28 and the HP shaft 34 through a first bearing 88, and the turbine rear frame 82 supports rotation of the LP turbine 30 and LP shaft 36 through a second bearing 90.

Further, it will be appreciated that the turbine section includes an outer turbine liner 92 and an inner turbine liner 94. The outer turbine liner 92 is positioned outward of the inner turbine liner 94 along the radial direction R. The outer turbine liner 92 and the inner turbine liner 94 together define at least in part the working gas flowpath 37. Further, the turbine section includes a transition duct 96 extending from the first turbine to the second turbine, or more specifically, from the LP turbine 30 to the HP turbine 28. In the embodiment depicted, the transition duct 96 is formed at least in part by the outer turbine liner 92 and the inner turbine liner 94 of the turbine section.

Figure 3:
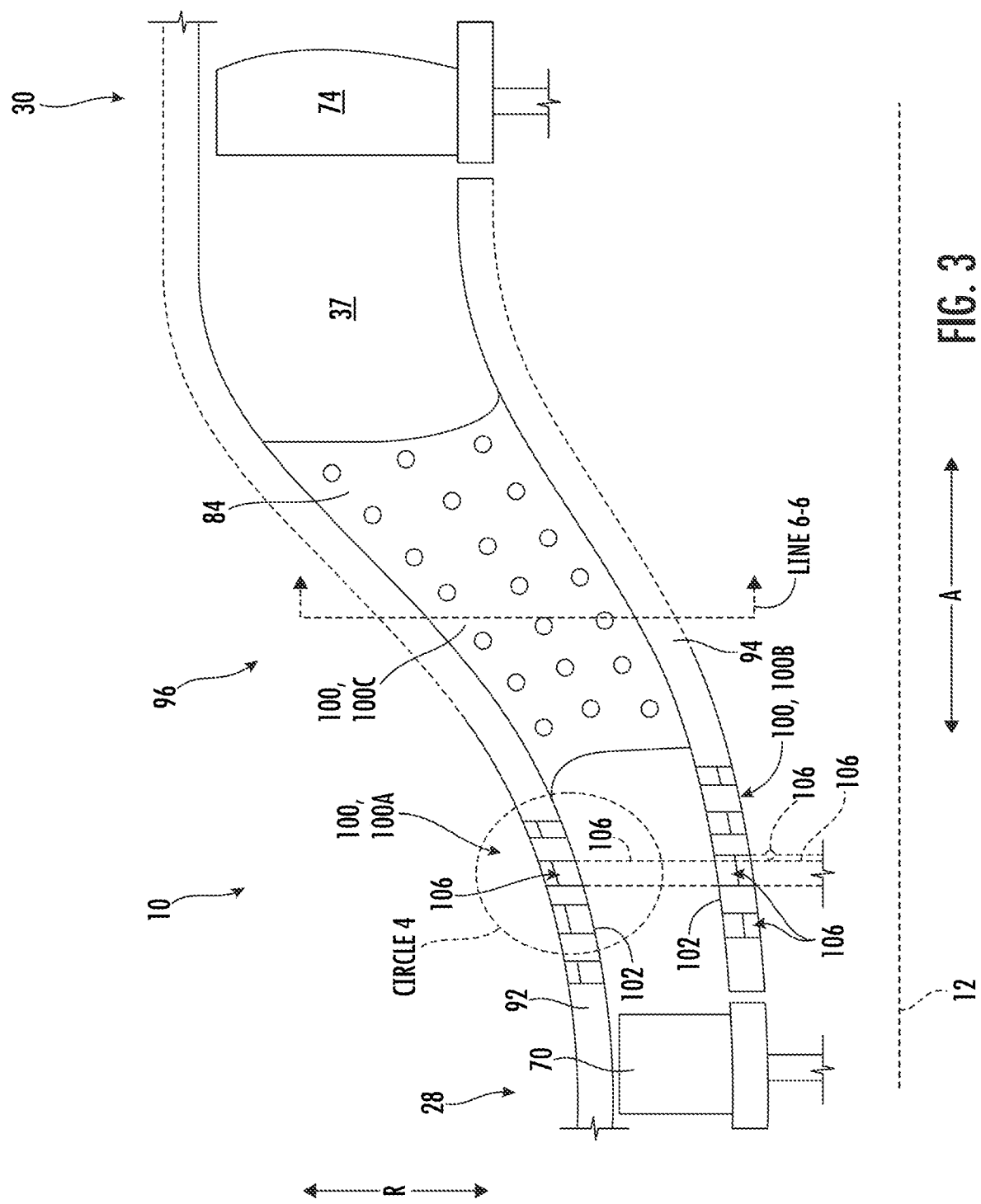
FIG. 3 is a close-up, schematic view of a transition duct of the turbine section of the gas turbine engine of FIG. 1, in accordance with an exemplary aspect of the present disclosure.

Referring now to FIG. 3, a close-up, schematic view is provided of the transition duct 96 of the turbine section of FIG. 2. As will be appreciated from the close-up view of FIG. 3, the turbine section further includes an acoustic liner 100. More specifically, for the embodiment depicted, the turbine section includes a first acoustic liner 100A coupled to or formed integrally with the outer turbine liner 92 of the turbine section, a second acoustic liner 100B coupled to or formed integrally with the inner turbine liner 94 of the turbine section, and a third acoustic liner 100C coupled to or formed integrally with an airfoil extending through the working gas flowpath 37. More specifically, for the embodiment depicted, the third acoustic liner 100C is coupled to or formed integrally with the turbine center frame strut 84 of the turbine center frame 80.

More specifically, referring also to FIG. 4, providing a close-up view of a portion of the outer turbine liner 92 within the transition duct 96 identified by Circle 4 in FIG. 3, the first acoustic liner 100A will be described in more detail.

The first acoustic liner 100A includes a flowpath wall 102 exposed to the working gas flowpath 37 within the turbine section, at a location downstream of the combustion section 26 (see FIG. 1). More specifically, the flowpath wall 102 is integrated into the outer turbine liner 92 of the turbine section, and positioned within the transition duct 96 of the turbine section.

The first acoustic liner 100A further includes a duct wall 104 extending from the flowpath wall 102 and defining at least in part an acoustic passage 106. More specifically, for the embodiment depicted, the acoustic passage 106 is a first acoustic passage 106A, and the duct wall 104 is a first duct wall 104A defining at least in part the first acoustic passage 106A of the acoustic liner 100. The acoustic liner 100 further includes a second duct wall 104B defining at least in part a second acoustic passage 106B, and a third duct wall 104C defining at least in part a third acoustic passage 106C.

Additionally, the transition duct 96 defines an opening 108. More specifically, the transition duct 96 defines a first acoustic passage opening 108A, with the first acoustic passage 106A being in airflow communication with the first acoustic passage opening 108A; a second acoustic passage opening 108B, with the second acoustic passage 106B being in airflow communication with the second acoustic passage opening 108B; and a third acoustic passage opening 108C, with the third acoustic passage 106C being in airflow communication with the third acoustic passage opening 108C.

Figure 4:
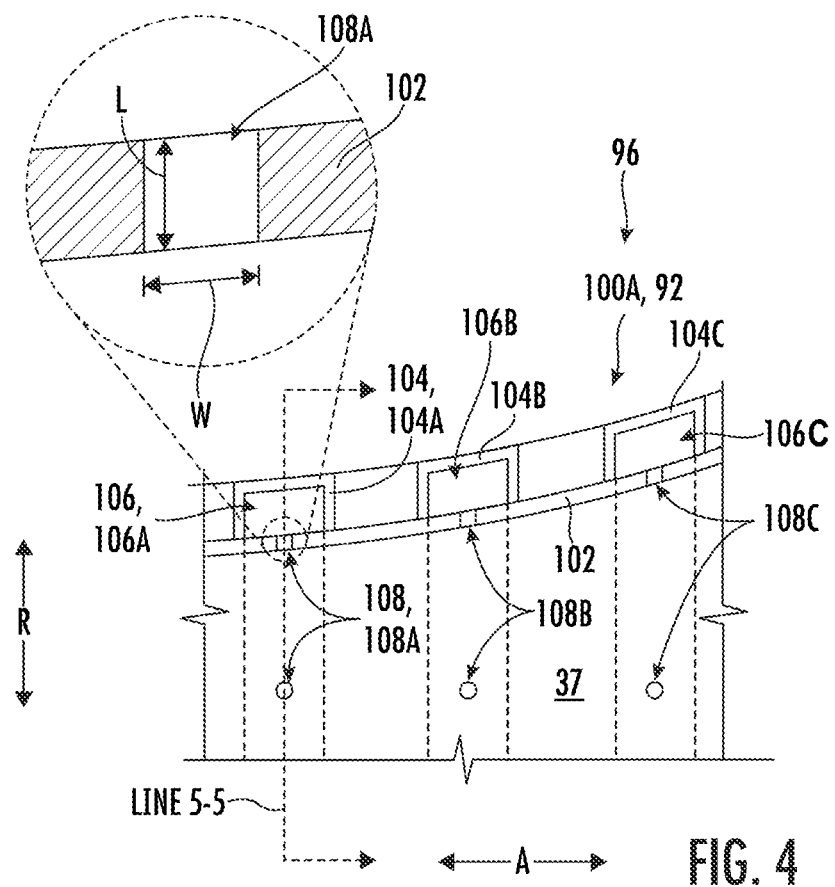
FIG. 4 is a close-up, schematic view of an acoustic liner incorporated into the transition duct of FIG. 3, in accordance with an exemplary aspect of the present disclosure.

More specifically, for the embodiment of FIG. 4, the first acoustic passage opening 108A is one of a plurality of first acoustic passage openings 108A, the second acoustic passage opening 108B is one of a plurality of second acoustic passage openings 108B, and the third acoustic passage opening 108C is one of a plurality of third acoustic passage openings 108C. As depicted in phantom, and as will be described in more detail below the first acoustic passage 106A, the second acoustic passage 106B, and the third acoustic passage 106C each extend in the circumferential direction C, and the plurality of first acoustic passage openings 108A, the plurality of second acoustic passage openings 108B, and the plurality of third acoustic passage openings 108C are each spaced from one another along the circumferential direction C.

Briefly, as is depicted in the callout Circle A, the first acoustic passage opening 108A defines a width W (which may also be referred to as a diameter in the embodiment shown) and a length L. In the embodiment shown, the first acoustic passage opening 108A defines a circular cross-sectional shape, and as such, the first acoustic passage opening 108A further defines an area A' equal to one half of the width W squared times Pi $$\left(A' = \pi\left(\frac{W}{2}\right)^2\right).$$

Each of the plurality of first acoustic passage openings 108A, each of the plurality of second acoustic passage openings 108B, and each of the plurality of third acoustic passage openings 108C similarly define an area A', a width W, and a length L.

Figure 5:
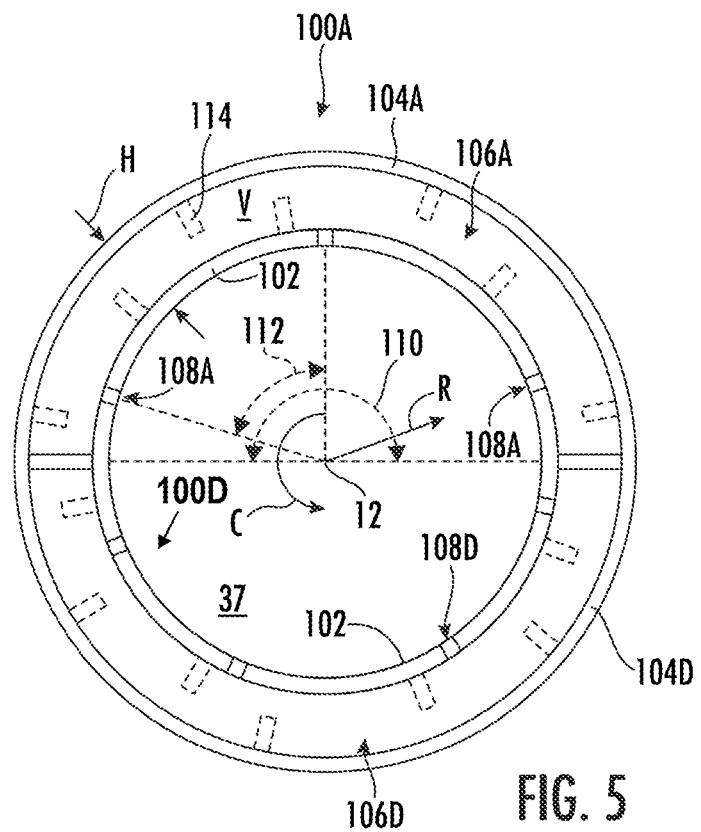
FIG. 5 is a schematic view of the acoustic liner of FIG. 4, as viewed along Line 5-5 in FIG. 4.

Referring now to FIG. 5, a schematic view is depicted of the first acoustic liner 100A along Line 5-5 in FIG. 4. In particular, the view of FIG. 5 is a cross-sectional view of the first acoustic liner 100A, as viewed along the longitudinal centerline 12 of the gas turbine engine 10.

As noted above, the first acoustic passage 106A extends along the circumferential direction C, and is defined by the first duct wall 104A and the flowpath wall 102. Further, the flowpath wall 102 defines the first acoustic passage opening 108A, and more specifically, the plurality of first acoustic passage openings 108A.

In the embodiment of FIG. 5, the first acoustic passage 106A extends at least 15 degrees and up to 360 degrees in the circumferential direction C relative to the longitudinal centerline 12 of the gas turbine engine 10. More specifically, for the embodiment depicted, the first acoustic passage 106A extends at least 25 degrees and up to 180 degrees in the circumferential direction C relative to the longitudinal centerline 12 of the gas turbine engine 10 (see angle 110). More specifically, still, for the embodiment depicted, the first acoustic passage 106A extends at least 90 degrees and up to 180 degrees in the circumferential direction C relative to the longitudinal centerline 12 of gas turbine engine 10.

It will be appreciated that in such a manner, the first acoustic passage 106A defines a volume V that may be relatively large for a radial footprint (e.g., a height H of the first acoustic passage 106A along the radial direction R) of the first acoustic passage 106A. As will be described in more detail below, such the relatively large volume V of the first acoustic passage 106A may allow for the first acoustic liner 100A to attenuate noise generated a relatively low frequency, such as noise generated by the combustion section 26 of the gas turbine engine 10 during operation of the gas turbine engine 10 (see, e.g., FIG. 1).

Moreover, as briefly noted above, the plurality of first acoustic passage openings 108A are spaced from one another along the circumferential direction C. In particular, for the embodiment depicted, the plurality of first acoustic passage openings 108A are spaced at least 10 degrees apart and up to 180 degrees apart in the circumferential direction C relative to the longitudinal centerline 12 of the gas turbine engine 10 (see angle 112). For example, the plurality of first acoustic passage openings 108A may be spaced at least 10 degrees apart, such as at least 20 degrees apart, such as at least 30 degrees apart, and up to 160 degrees apart, such as up to 150 degrees apart, such as up 120 degrees apart.

Referring still to FIG. 5, it will be appreciated that the first acoustic liner 100A further includes a fourth duct wall 104D extending from the flowpath wall 102 and defining at least in part a fourth acoustic passage 106D. The flowpath wall 102 further defines a fourth passage opening 108D, and more specifically, a plurality of fourth passage openings 108D spaced along the circumferential direction C. The fourth acoustic passage 106D is located in a common plane with the first acoustic passage 106A (i.e., the plane depicted in FIG. 5; perpendicular to the longitudinal centerline 12 of the gas turbine engine 10).

Notably, as is depicted in phantom, the first acoustic liner 100A may include one or more blockers 114 positioned within the first acoustic passage 106A. The one or more blockers 114 may be, e.g., fins extending into the first acoustic passage 106A configured to lengthen a path for an airflow to travel through the first acoustic passage 106A.

The first acoustic passage opening 108A, and more specifically, the plurality of first acoustic passage openings 108A, are configured to allow for an airflow through the working gas flowpath 37 to communicate with the first acoustic passage 106A. In particular, the airflow through the working gas flowpath 37 may compress an air within the volume V of the first acoustic passage 106A, creating a vibration at a frequency. In such a manner, the first acoustic passage 106A, and the first plurality of first acoustic passage openings 108A, may act as a Helmholtz resonator. The frequency of the vibration may act to dampen acoustic waves through the working gas flowpath 37.

More specifically, as noted above, the acoustic liner 100 may be configured to target relatively low frequency noise, such as noise generated by the combustor during an operating condition of the gas turbine engine 10. The operating condition may be an operating condition where noise attenuation may be desired. For example, the first acoustic passage 106A may be configured to attenuate noise at a frequency between 100 Hz and 1000 Hz. The structure of the first acoustic passage 106A, and more specifically, of the flowpath wall 102, the first acoustic passage opening 108A (or rather the plurality of first acoustic passage openings 108A), and the first duct wall 104A, may be prescribed by a resonance frequency relationship as follows:

$$f = \frac{c}{2 \times \pi} \sqrt{\frac{A'}{V \times L}}$$

wherein f is the frequency targeted by the first acoustic passage 106A (e.g., between 100 Hz and 2000 Hz, such as between 100 Hz and 1000 Hz), wherein c is the speed of sound of a gas flow over the first acoustic liner 100A at the operating condition of the gas turbine engine 10, wherein A' is the area of the first acoustic passage opening 108A, wherein L is the length of the first acoustic passage opening 108A, and V is the volume of the first acoustic passage 106A.

Notably, the operating condition of the gas turbine engine 10 may be an operation of the gas turbine engine 10 at a rated speed during standard day operating conditions. As will be appreciated, the speed of sound, c, of the gas flow over the first acoustic liner 100A may depend on a location of the first acoustic liner 100A and various characteristics of the gas turbine engine 10.

Referring back briefly to FIG. 4, it will be appreciated that the second duct wall 104B, the second acoustic passage opening 108B (or rather the plurality of second acoustic passage openings 108B), and the second acoustic passage 106B may be configured in a similar manner as the first duct wall 104A, the first acoustic passage opening 108 A (or rather the plurality of first acoustic passage openings 108A), and the first acoustic passage 106A. Similarly, it will be appreciated that the third duct wall 104C, the third acoustic passage opening 108C (or rather the plurality of third acoustic passage openings 108C), and the third acoustic passage 106C may also be configured in a similar manner as the first duct wall 104A, the first acoustic passage opening 108A (or rather the plurality of first acoustic passage openings 108A), and the first acoustic passage 106A.

Moreover, referring back to FIG. 3, as previously noted, the second acoustic liner 100B is coupled to or formed integrally with the inner turbine liner 94. In such manner, it will be appreciated that a flowpath wall 102 of the second acoustic liner 100B may be integrated into the inner turbine liner 94 at a location within the transition duct 96. As depicted schematically in FIG. 3, the second acoustic liner 100B may be configured in a similar manner as the first acoustic liner 100A. In such a manner, it will be appreciated that the second acoustic liner 100B may define a plurality of acoustic passages 106 extending in the circumferential direction C and spaced from one another along the longitudinal centerline 12 of the gas turbine engine 10. Notably, the flowpath wall 102 of the second acoustic liner 100B may define one or more openings (not shown; see, e.g., openings 108 of FIG. 4) exposed to the working gas flowpath 37, with the plurality of acoustic passages 106 defined by the second acoustic liner 100B in airflow communication with respective opening(s).

Further, it will be appreciated that as depicted in phantom in FIG. 3, the various acoustic passages 106 of the first acoustic liner 100A and the second acoustic liner 100B are configured to extend in the circumferential direction C. It will be appreciated that as used herein, the term "extend in the circumferential direction C" refers to a direction of extension directly in the circumferential direction C, i.e., directly in a reference plane perpendicular to the longitudinal centerline 12 of the gas turbine engine 10, as shown, as well as a direction of extension defining an angle with the reference plane less than 45 degrees, such as less than 30 degrees, such as less than 15 degrees. Notably, in at least certain exemplary embodiments, it may be desirable to have an acoustic liner with acoustic passage(s) 106 extending in a direction of extension defining an angle with the reference plane greater than zero so as to allow a relatively compact positioning of relatively long acoustic passages 106 circumferentially.

Further, still, it will be appreciated that the various acoustic liners 100 depicted in FIG. 3 may be structured to target different frequencies. For example, the various acoustic liners 100 along the axial direction A may be configured to target different frequencies (e.g., acoustic liners 100A, 100B, 100C), the various acoustic liners 100 along the circumferential direction C may be configured to target different frequencies (e.g., acoustic liners 100A, 100D; see FIG. 5), or both. For example, the first acoustic passage 106A of the first acoustic liner 100A defines a volume V and has first acoustic passage openings 108A targeted to attenuate noise at a first frequency. The second acoustic passage 106B of the second acoustic liner 100B may define a volume V and may have second acoustic passage openings 108B targeted to attenuate noise at a second frequency (e.g., by way of different sized openings 108B, longer or shorter circumferential extensions (see angle 110 of FIG. 5), larger or smaller radial or axial measurements of the second acoustic passage openings 108B, etc.). The second frequency may be different than the first frequency. For example, one of the first or second frequencies may be between 100 Hz and 500 Hz, and the other of the first or second frequencies may be between 500 HZ and 2000 Hz.

Moreover, as is also depicted in FIG. 3, and briefly noted above, the third acoustic liner 100C is coupled to or formed integrally with the turbine center frame strut 84. In particular, referring also to FIG. 6, a cross-sectional view of a portion of the turbine center frame strut 84 along Line 6-6 and FIG. 3 is provided.

As noted, the third acoustic liner 100C is coupled to or formed integrally with the turbine center frame strut 84. The turbine center frame strut 84 generally defines a first side 116 and a second side 118 opposite one another along the circumferential direction C. In at least certain exemplary embodiments, the first side 116 may be a pressure side and the second side 118 may be a suction side. The third acoustic liner 100C is coupled to or formed integrally with the turbine center frame strut 84 at the first side 116.

More specifically for the embodiment depicted, the exemplary third acoustic liner 100C depicted includes a flowpath wall 102 integrated into the turbine center frame strut 84, exposed to a flow through the working gas flowpath 37 through the turbine section over the turbine center frame strut 84.

In addition, the exemplary third acoustic liner 100C further includes a duct wall 104 extending from the flowpath wall 102 and defining at least in part an acoustic passage 106. In particular, the duct wall 104 includes a backing wall 120 and a plurality of separator walls 122 extending between the backing wall 120 and the flowpath wall 102. The plurality of separator walls 122, the backing wall 120, and the flowpath wall 102 together define the acoustic passage 106 in the embodiment depicted. The acoustic passage 106 defines a volume V.

Moreover, the flowpath passage further defines an opening 108, with the acoustic passage 106 in airflow communication with the opening 108. In particular, for the embodiment depicted, the flowpath passage further defines a plurality of openings 108, with the acoustic passage 106 in airflow communication with each of the plurality of openings 108. Each opening 108 of the plurality of openings 108 defines an area A' and a length L (see, e.g., FIG. 4 above).

Briefly, it will further be appreciated that the turbine center frame strut 84 defines an interior area 124 between the backing wall 120 and an exterior wall 126 forming the second side 118 of the turbine center frame strut 84. The interior area 124 may be utilized to transport ducts, conduits, fluid flows, etc. between a location outward of the working gas flowpath 37 along the radial direction R to a location inward of the working gas flowpath 37 along the radial direction R. Further, in at least certain exemplary embodiments, the backing wall 120 and the exterior wall 126 may be structural walls to provide the structural support for supporting, e.g., the HP shaft 34 (see FIG. 2).

In alternative embodiments, however, the backing wall 120 may simply be a cover plate attached to the flowpath wall 102 such that the acoustic passage 106 defines a desired volume V.

Moreover, it will be appreciated that as with the first acoustic liner 100A described above, the structure of the third acoustic liner 100C may be prescribed by the resonance frequency relationship, such that the third acoustic passage 106C attenuates noise at a frequency between 100 Hz and 1,000 Hz.

Figure 6:
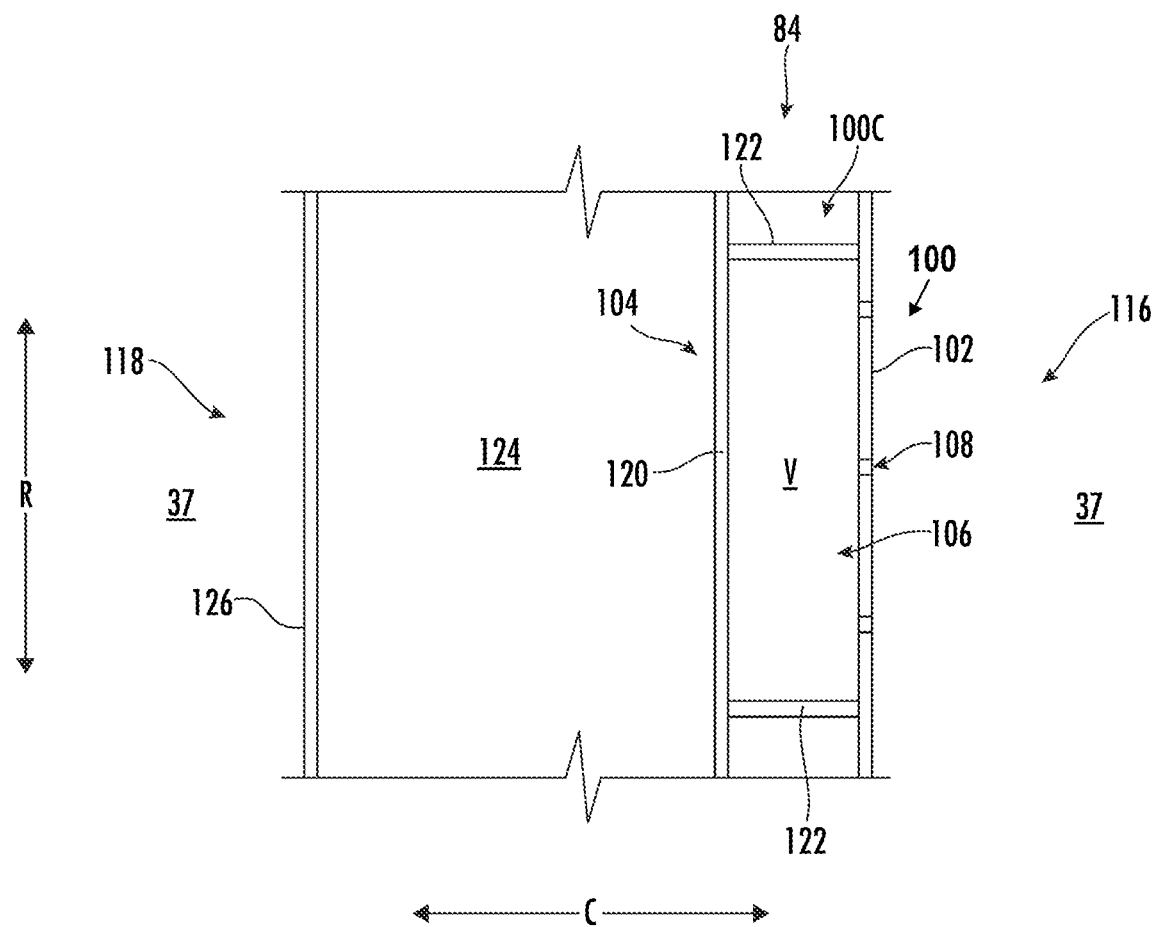
FIG. 6 is a close-up, schematic view of an acoustic liner incorporated into a frame strut of FIG. 3, in accordance with an exemplary aspect of the present disclosure.

Notably, although the exemplary turbine center frame strut 84 depicted in FIG. 6 includes a single acoustic liner 100 (i.e., the third acoustic liner 100C) positioned on the first side 116 of the turbine center frame strut 84, in other exemplary embodiments of the turbine center frame strut 84 may include an acoustic liner 100 in accordance with exemplary aspects of the present disclosure located on the second side 118 of the turbine center frame strut 84, or positioned on both the first side 116 and the second side 118 of the turbine center frame strut 84.

Moreover, referring briefly back to FIG. 2, it will be appreciated that in still other exemplary aspects of the present disclosure, the turbine section of the gas turbine engine 10 may include additional or alternative acoustic liners 100 in accordance with various exemplary aspects of the present disclosure positioned at any other suitable location. In particular, in other exemplary aspects of the present disclosure, the turbine section may include an acoustic liner 100 in accordance with one or more exemplary aspects of the present disclosure integrated into the outer turbine liner 92 downstream of the LP turbine 30, integrated into the inner turbine liner 94 downstream of the LP turbine 30, integrated into the turbine rear frame strut 86, or a combination thereof. Further, in still other exemplary aspects, the turbine section may include an acoustic liner 100 in accordance with one or more exemplary aspects of the present disclosure integrated into any other suitable airfoil (e.g., a stage 1 nozzle, various stator vanes, etc.), or within the outer or inner turbine liners 92, 94 at any other suitable location downstream of the combustion section.

It will be appreciated that in one or more exemplary aspects of the present disclosure, the acoustic liners 100 disclosed may be formed in any suitable manner. For example, in certain exemplary aspects, one or more of the acoustic liners 100 may be formed through an additive manufacturing process. Such may allow for a high level of control of relatively complex geometries.

Alternatively, in other exemplary embodiments, one or more of the acoustic liners described herein may be formed using any other suitable manufacturing process.

Further, it will be appreciated that the exemplary acoustic liners 100 described herein are provided by way of example only, and in other exemplary aspects of the present disclosure. For example, in certain exemplary aspects, one or more of the exemplary acoustic liners 100 described herein may not define multiple openings 108 in airflow communication with a single acoustic passage 106. Further, although in at least certain exemplary aspects of the present disclosure, a structure of the acoustic liner 100 set to attenuates noise at a frequency between 100 Hz and 1,000 Hz to specifically target noise from a combustion section of a gas turbine engine 10, in other exemplary aspects, the gas turbine engine may include one or more acoustic liners 100 with a structure set to attenuate noise at a higher frequency (e.g., between 2,000 Hertz and 12,000 Hertz, such as up to 5,000 Hertz).

Moreover, it will be appreciated that although the exemplary acoustic liners 100 described above are described as being positioned within a turbine section of a gas turbine engine 10, having a flowpath wall 102 exposed to a working gas flowpath 37 of the gas turbine engine 10 within a turbine section of the gas turbine engine 10. In other exemplary aspects of the present disclosure, one or more acoustic liners 100 may be positioned at any other suitable location within the gas turbine engine 10, e.g., exposed to the working gas flowpath 37.

Figure 7:
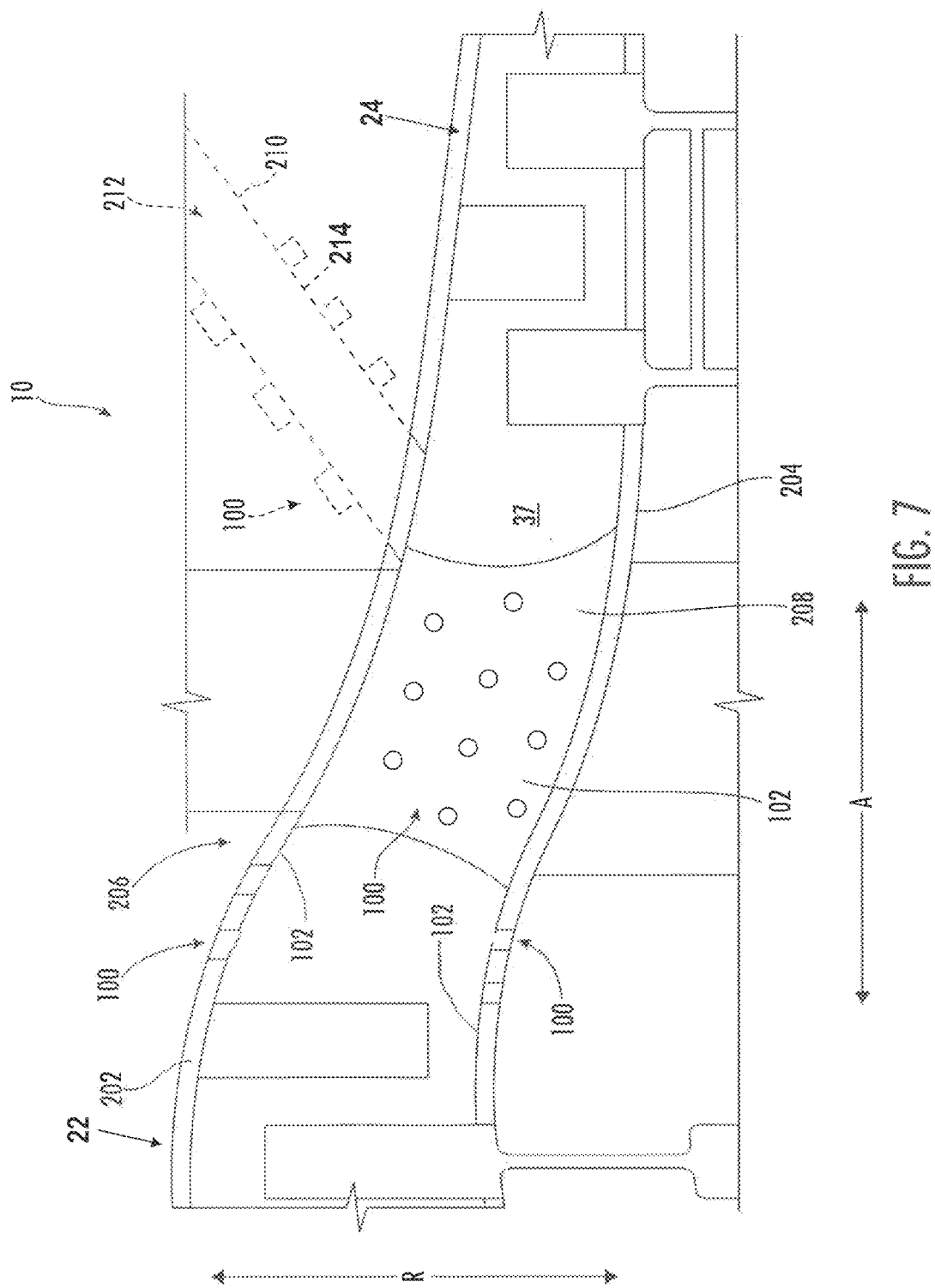
FIG. 7 is a close-up, schematic view of a portion of a compressor section of the exemplary gas turbine engine of FIG. 1, in accordance with an exemplary aspect of the present disclosure.

For example, referring now to FIG. 7, a close-up, schematic view of a portion of a compressor section of the exemplary gas turbine engine 10 of FIG. 1, in accordance with an exemplary aspect of the present disclosure, is provided. The compressor section includes the LP compressor 22 and the HP compressor 24, and defines in part the working gas flowpath 37. Moreover, the compressor section includes an outer liner 202 and an inner liner 204 spaced from one another along a radial direction R and together defining in part the working gas flowpath 37. The outer liner 202 and inner liner 204 extend between the LP compressor 22 and the HP compressor 24, forming a transition duct 206. The gas turbine engine 10 further includes a frame strut 208 extending through the working gas flowpath 37 within the compressor section, which more specifically for the embodiment shown may be a frame strut 208 of a compressor center frame. Notably, although not depicted in FIG. 7, the gas turbine engine 10 may further include a compressor forward frame having a frame strut extending through the working gas flowpath 37 at a location upstream of the LP compressor 22. Further, as is depicted schematically and in phantom, the exemplary gas turbine engine 10 may further include a third stream liner 214 defining a third stream 212 extending from the transition duct 206. For the purposes of the present disclosure, the third stream 212 is considered part of the working gas flowpath 37. As will be appreciated, in other embodiments, an inlet to the third stream 212 may be positioned at any suitable location (e.g., within the LP compressor 22 or downstream of the LP compressor 22 and upstream of the HP compressor 24).

Moreover, the exemplary gas turbine engine 10 of FIG. 7 includes a plurality of acoustic liners 100. The acoustic liners 100 are positioned at a variety of locations for exemplary purposes. In particular, the acoustic liners 100 are positioned on or integrated into the outer liner 202, the inner liner 204, the transition duct 206, the compressor frame strut 208, and the third stream liner 214.

In such a manner, it will be appreciated that a flowpath wall 102 of an acoustic liner 100 of the present disclosure may be exposed to the working gas flowpath 37 at a location upstream of a combustion section, and an acoustic passage of the acoustic liner 100 may be operable to attenuate noise through the working gas flowpath 37 within the compressor section. As will be appreciated, noise from the combustion section may travel upstream as well as downstream, such that inclusion of one or more acoustic liners 100 as described above with reference to FIG. 7 may help attenuate such noise in the compressor section.

Further aspects are provided by the subject matter of the following clauses:

A gas turbine engine comprising: a turbomachine comprising a compressor section, a combustion section, and a turbine section arranged in serial flow order and together defining a working gas flowpath, the turbomachine comprising an acoustic liner, the acoustic liner comprising: a flowpath wall exposed to the working gas flowpath, the flowpath wall defining an opening; and a duct wall extending from the flowpath wall defining at least in part an acoustic passage defining a volume, the acoustic passage operable to attenuate noise through the working gas flowpath during an operating condition of the gas turbine engine.

The gas turbine engine of the preceding clause, wherein the flowpath wall is exposed to the working gas flowpath at a location downstream of the combustion section, and wherein the acoustic passage is operable to attenuate noise through the working gas flowpath within the turbine section.

The gas turbine engine of any of the preceding clauses, wherein the turbomachine comprises an outer turbine liner and an inner turbine liner positioned within the turbine section of the turbomachine, and wherein the flowpath wall is integrated into the outer turbine liner or the inner turbine liner.

The gas turbine engine of any of the preceding clauses, wherein the turbine section defines a transition duct extending from a first turbine of the turbine section to a second turbine of the turbine section, and wherein the outer turbine liner and the inner turbine liner are positioned within the transition duct.

The gas turbine engine of any of the preceding clauses, wherein the acoustic passage extends along a circumferential direction of the gas turbine engine.

The gas turbine engine of any of the preceding clauses, wherein the acoustic passage extends at least 15 degrees and up to 360 degrees in the circumferential direction relative to a longitudinal centerline of the gas turbine engine.

The gas turbine engine of any of the preceding clauses, wherein the acoustic passage extends at least 25 degrees and up to 180 degrees in the circumferential direction relative to a longitudinal centerline of the gas turbine engine.

The gas turbine engine of any of the preceding clauses, wherein the opening of the flowpath wall is a first opening of a plurality of an openings defined by the flowpath wall, wherein the acoustic passage is in airflow communication with each opening of the plurality of openings.

The gas turbine engine of any of the preceding clauses, wherein the plurality of openings are spaced along the circumferential direction.

The gas turbine engine of any of the preceding clauses, wherein the plurality of openings are spaced at least 10 degrees apart and up to 180 degrees apart in the circumferential direction relative to a longitudinal centerline of the gas turbine engine.

The gas turbine engine of any of the preceding clauses, wherein the turbomachine comprises a frame strut extending through the working gas flowpath within the turbine section of the turbomachine or within the compressor section of the turbomachine, and wherein the flowpath wall is integrated into the frame strut.

The gas turbine engine of any of the preceding clauses, wherein the opening of the flowpath wall is a first opening of a plurality of openings defined by the flowpath wall.

The gas turbine engine of any of the preceding clauses, wherein the frame strut is a turbine center frame strut or a turbine rear frame strut positioned within the turbine section.

The gas turbine engine of any of the preceding clauses, wherein the duct wall is spaced from the flowpath wall to define the acoustic passage.

The gas turbine engine of any of the preceding clauses, wherein during the operating condition of the gas turbine engine is operation of the gas turbine engine at a rated speed during standard day operating conditions, and wherein during the operating condition, the acoustic passage attenuates noise at a frequency between 100 Hertz and 1,000 Hertz as prescribed by a resonance frequency relationship.

The gas turbine engine of any of the preceding clauses, wherein the resonance frequency relationship is:

$$f = \frac{c}{2 \times \pi} \sqrt{\frac{A}{V \times L}}$$

wherein f is the frequency, wherein c is the speed of sound of a gas flow over the acoustic liner at the operating condition, wherein A is an area of the opening, wherein L is a length of the opening, and V is the volume of the acoustic passage.

An acoustic liner for a gas turbine engine defining an axial direction and a circumferential direction, the acoustic liner comprising: a flowpath wall exposed to a working gas flowpath of the gas turbine engine when the acoustic liner is installed in the gas turbine engine, the flowpath wall defining an opening; and a duct wall extending from the flowpath wall defining at least in part an acoustic passage, the acoustic passage in airflow communication with the opening and extending along the circumferential direction when the acoustic liner is installed in the gas turbine engine.

The acoustic liner of any of the preceding clauses, wherein the acoustic passage extends at least 15 degrees and up to 360 degrees in the circumferential direction relative to a longitudinal centerline of the gas turbine engine when the acoustic liner is installed in the gas turbine engine.

The acoustic liner of any of the preceding clauses, wherein the opening of the flowpath wall is a first opening of a plurality of an openings defined by the flowpath wall, wherein the acoustic passage is in airflow communication with each opening of the plurality of openings.

The acoustic liner of any of the preceding clauses, wherein the plurality of openings are spaced along the circumferential direction when the acoustic liner is installed in the gas turbine engine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine comprising:
a turbomachine comprising a compressor section, a combustion section, and a turbine section arranged in serial flow order and together defining a working gas flowpath, the turbine section comprising a high pressure turbine and a low pressure turbine, the turbomachine comprising an acoustic liner, the acoustic liner comprising:
a transition duct defined by an inner turbine liner, an outer turbine liner, and a strut extending from the inner turbine liner to the outer turbine liner, the transition duct extends between the high pressure turbine and the low pressure turbine, wherein the inner turbine liner and the outer turbine liner define a portion of the working gas flowpath, wherein at least one of the inner turbine liner or the outer turbine liner defines an opening upstream or downstream from the strut, wherein a third liner is coupled to the strut; and
wherein the opening is in airflow communication with an acoustic passage defined by a duct wall, the acoustic passage operable to attenuate noise through the working gas flowpath during an operating condition of the gas turbine engine, wherein the transition duct is disposed at a location downstream of the combustion section, wherein the acoustic passage is operable to attenuate noise through the working gas flowpath within the turbine section, wherein a plurality of fins extend into the acoustic passage and are configured to lengthen a path for an airflow to travel through the acoustic passage, wherein the acoustic passage is defined by the duct wall and a flowpath wall, wherein the plurality of fins include a first plurality of fins that extend from the duct wall into the acoustic passage and a second plurality of fins that extend from the flowpath wall into the acoustic passage, wherein the acoustic passage extends along a circumferential direction of the gas turbine engine, wherein the first plurality of fins and the second plurality of fins are disposed in a staggered and alternating configuration in the circumferential direction, wherein the airflow travels through the working gas flowpath to compress air within the acoustic passage thereby creating a vibration at a frequency.

2. The gas turbine engine of claim 1, wherein the opening is integrated into the outer turbine liner.

3. The gas turbine engine of claim 1, wherein the acoustic passage extends at least 15 degrees and up to 360 degrees in the circumferential direction relative to a longitudinal centerline of the gas turbine engine.

4. The gas turbine engine of claim 1, wherein the acoustic passage extends at least 25 degrees and up to 180 degrees in the circumferential direction relative to a longitudinal centerline of the gas turbine engine.

5. The gas turbine engine of claim 1, wherein the opening is a first opening of a plurality of openings defined by the at least one of the inner turbine liner or the outer turbine liner, wherein the acoustic passage is in airflow communication with each opening of the plurality of openings.

6. The gas turbine engine of claim 5, wherein the plurality of openings are spaced along the circumferential direction.

7. The gas turbine engine of claim 5, wherein the plurality of openings are spaced at least 10 degrees apart and up to 180 degrees apart in the circumferential direction relative to a longitudinal centerline of the gas turbine engine.

8. The gas turbine engine of claim 1, wherein the transition duct is positioned within the turbine section of the turbomachine, the strut having a first side wall circumferentially spaced from a second side wall and defining a volume therebetween, wherein one of the first side wall or the second side wall defines a side wall opening, wherein the side wall opening provides for air communication between the working gas flowpath and the volume, wherein the duct wall extends between the first side wall and the second side wall within the volume defining at least in part the acoustic passage, the acoustic passage operable to attenuate noise through the working gas flowpath during the operating condition of the gas turbine engine.

9. The gas turbine engine of claim 8, wherein the side wall opening of the first side wall or the second side wall is a first side wall opening of a plurality of side wall openings defined by the first side wall or the second side wall.

10. The gas turbine engine of claim 8, wherein the strut is a turbine center frame strut or a turbine rear frame strut positioned within the turbine section.

11. The gas turbine engine of claim 8, wherein the duct wall is spaced between the first side wall and the second side wall to define the acoustic passage.

12. The gas turbine engine of claim 1, wherein during the operating condition of the gas turbine engine is operation of the gas turbine engine at a rated speed during standard day operating conditions, and wherein during the operating condition, the acoustic passage attenuates noise at a frequency between 100 Hertz and 1,000 Hertz as prescribed by a resonance frequency relationship.

13. The gas turbine engine of claim 12, wherein the resonance frequency relationship is:

$$f = \frac{c}{2 \times \pi} \sqrt{\frac{A}{V \times L}}$$

wherein f is the frequency, wherein c is the speed of sound of a gas flow over the acoustic liner at the operating condition, wherein A is an area of the opening, wherein L is a length of the opening, and V is the volume of the acoustic passage.

14. An acoustic liner for a gas turbine engine defining an axial direction and a circumferential direction, the acoustic liner comprising:

a transition duct comprising an inner turbine liner, an outer turbine liner, and a strut that extends radially therebetween, wherein the transition duct at least partially defines a portion of a working gas flowpath of the gas turbine engine upstream or downstream from a combustion section of the gas turbine engine when the acoustic liner is installed in the gas turbine engine, at least one of the inner turbine liner or the outer turbine liner defining an opening that extends therethrough, wherein a third liner is coupled to the strut, the transition duct extends between a high pressure turbine and a low pressure turbine of the gas turbine engine when the acoustic liner is installed in the gas turbine engine; and an acoustic passage, the acoustic passage in airflow communication with the opening and extending along the circumferential direction when the acoustic liner is installed in the gas turbine engine, wherein the opening is a first opening of a plurality of openings, wherein the acoustic passage is in airflow communication with each opening of the plurality of openings, wherein a plurality of fins extend into the acoustic passage and are configured to lengthen a path for an airflow to travel through the acoustic passage, wherein the acoustic passage is defined by a duct wall and a flowpath wall, wherein the plurality of fins include a first plurality of fins that extend from the duct wall into the acoustic passage and a second plurality of fins that extend from the flowpath wall into the acoustic passage, wherein the first plurality of fins and the second plurality of fins are disposed in a staggered and alternating configuration in the circumferential direction, wherein the airflow travels through the working gas flowpath to compress air within the acoustic passage thereby creating a vibration at a frequency.

15. The acoustic liner of claim 14, wherein the acoustic passage extends at least 15 degrees and up to 360 degrees in the circumferential direction relative to a longitudinal centerline of the gas turbine engine when the acoustic liner is installed in the gas turbine engine.

16. The acoustic liner of claim 14, wherein the plurality of openings are spaced along the circumferential direction when the acoustic liner is installed in the gas turbine engine.

* * * * *